Patented Oct. 9, 1923.

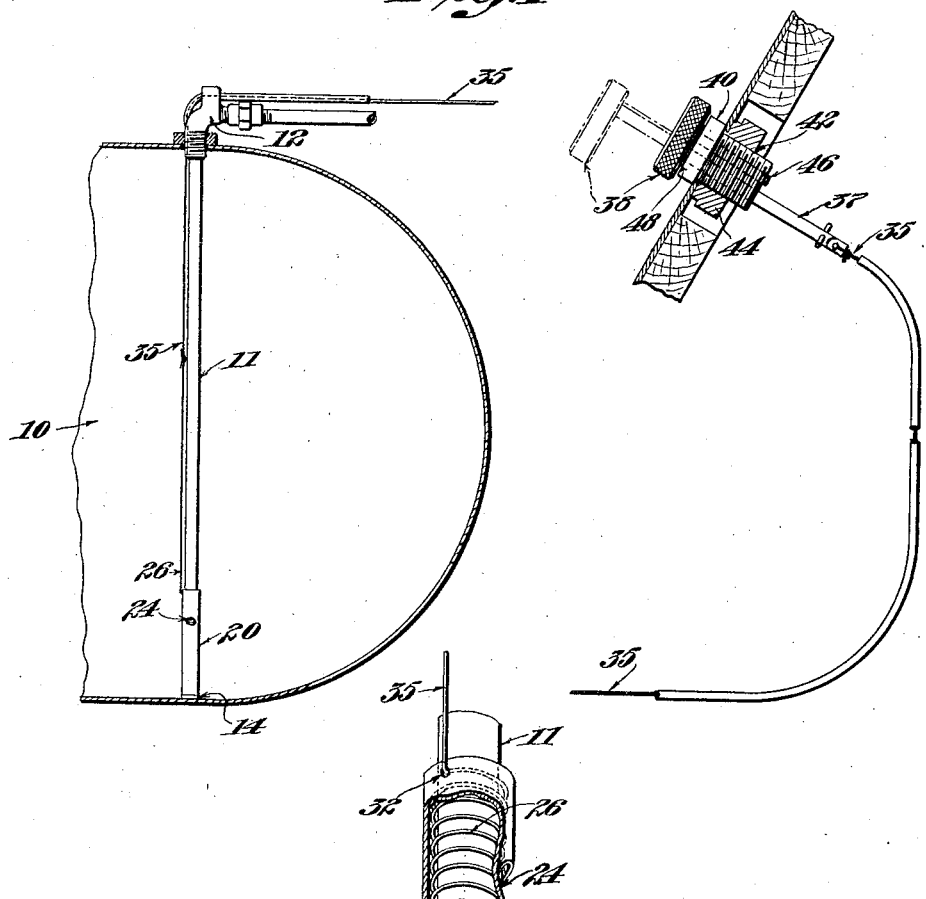

1,469,937

UNITED STATES PATENT OFFICE.

ALEXANDER W. HUTCHINSON, OF BOSTON, MASSACHUSETTS.

TANK CONTROL FOR MOTOR VEHICLES.

Application filed October 6, 1920. Serial No. 415,186.

*To all whom it may concern:*

Be it known that I, ALEXANDER W. HUTCHINSON, a citizen of the United States, residing at Boston, in the county of Suffolk and State of Massachusetts, have invented certain new and useful Improvements in Tank Controls for Motor Vehicles; and I do hereby declare the following to be a full, clear, and exact description of the invention, such as will enable others skilled in the art to which it appertains to make and use the same.

The present invention relates to apparatus particularly applicable to the fuel supply systems of automobiles and more particularly to apparatus for indicating when the supply of fuel within the tank is getting low.

It will be obvious to those skilled in the art that some form of apparatus for insuring a reserve supply of gasoline is a desirable attribute for motor vehicles in order that the supply shall not become completely exhausted before such a warning is had.

One object of the present invention is to provide means for insuring a reserve supply of gasoline which may be conveniently and simply embodied in certain existing types of motor vehicles with slight changes.

A further object of the invention is to provide means for insuring a reserve supply of gasoline which may be operated from the dash of the motor vehicle to permit utilization of the reserve after the main supply of gasoline has become exhausted.

With these objects in view the several features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a partially diagrammatic view illustrating the apparatus as it is embodied in the main supply tank and with the proper dashboard connections; and Fig. 2 is a detail illustrating the construction embodied in the supply tank for insuring a reserve supply of gasoline.

Certain features of the present invention are adapted to motor vehicles employing either gravity, pressure feed or vacuum feed for the gasoline although the illustrated embodiment of the invention is designed more particularly for those vehicles which are provided with a vacuum system of gasoline feed. It will be obvious to those skilled in the art that according to this system, the gasoline is conducted to an auxiliary tank by means of a vacuum, the surface of the gasoline in the main supply tank being subjected to atmospheric pressure. In this type of construction it is usual to provide a gasoline feed pipe which leads from the top of the supply tank downwardly to the bottom, the gasoline passing from the bottom of the tank upwardly through the pipe and thence to the usual vacuum tank.

In the illustrated embodiment of the invention, the usual supply tank is indicated at 10 as provided with a feed pipe 11 leading downwardly from the top of the tank and secured in place by a threaded nipple or elbow 12. According to the present invention, the feed pipe is provided at its lower end with a cap 14 having a slightly tapered face 16 provided with openings 18 through which the gasoline passes into the lower end of the feed pipe. Surrounding the feed pipe is a sliding sleeve 20 which closely fits the tapered face of the cap 14 when the sleeve is seated against the head 22 of the cap to form a liquid tight joint at this point. At a substantial distance above the lower end the sleeve is provided with openings 24 which serve to determine the reserve level of gasoline in the tank in a manner which will be obvious to those skilled in the art. As soon as the level of gasoline drops below the height of the openings the vacuum seal is broken by the rush of air into the feed pipe and the gasoline flow fails. In order to maintain the sleeve 20 yieldingly in the reserve position a spring 26 is coiled in the space between the sleeve and the feed pipe 11, this spring having a hook 28 formed upon its lower end which engages over the lower edge of the feed pipe, as will be obvious from Fig. 2, the cap 14 having a longitudinal slot 30 formed therein in which the hook lies. The continuation of the upper end of the spring 26 passes through a small opening 32 in the sleeve and is clamped thereto to connect the spring with the sleeve. In order to permit the reserve supply of gasoline to be utilized the sleeve is elevated sufficiently to allow gasoline to flow through the openings 18 formed in the wall of the cap and thence directly into the lower end of the feed pipe at 34. In order to facilitate the elevation of the sleeve and permit the operator to accomplish this without leaving the seat, a connection is provided between the sleeve and a suitable operating instrumentality located upon the dashbord of the vehicle, as will be evident from an inspection of Fig. 1 of the drawings. The sleeve is connected to an operating wire or cable 35 which passes through the upper end of the tank adjacent the feed pipe and is conducted from this point in any suitable manner to the dashboard. At the dash this operating connection is secured to the inner end of a sliding pin 37 which passes through the dash and is provided with a handle 38 upon its opposite end. The operating instrumentality is conveniently held in position by a head 40 passing through an opening in the dash and provided with a threaded portion 42 which is provided with a lock nut 44 engaging the opposite side of the dashboard to clamp the instrumentality into position. It will be observed that the pin 37 slides freely in a passage formed in the head. In addition to the pin 37 a second and shorter pin 46 also passes through the head 40 and is adapted upon the withdrawal of the pin 37 to its limit and a slight turning movement of the member 38 to engage with the face 48 of the head 40 and lock the pin 37 in outward position. In this position the sleeve is elevated and the supply of gasoline in the tank will be completely exhausted. Upon a refilling of the tank the controlling mechanism upon the dash is manipulated to permit the sleeve to return to its initial and normal position.

It will be observed that this construction provides an extremely simple and efficient mechanism for insuring the maintenance of a reserve supply of gasoline and for conveniently utilizing the reserve when needed without the necessity of the operator leaving the seat of the vehicle.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A tank control for motor vehicles comprising a fuel feed pipe projecting into the supply tank and having an open end, a sleeve sliding upon the pipe and having openings therein removed from the end, means for normally maintaining the sleeve in a position to cover the open end of the pipe and cause the fuel to flow through the openings in the sleeve, and means located upon the dashboard of the vehicle and operatively connected with the sleeve for moving the sleeve to uncover the open end of the pipe and permit the flow of fuel directly thereinto.

2. A tank control for motor vehicles comprising a fuel pipe projecting downwardly into the supply tank, a cap enclosing the lower end of the pipe and having an opening therein to permit the flow of fuel into the pipe, an elongated sleeve sliding upon the pipe and having an opening located at a substantial distance above the lower end, the sleeve being adapted in one position to prevent the flow of fuel into the pipe except through the opening in the sleeve and in a second position to permit the flow of fuel from the tank directly into the lower end of the pipe, a coiled spring within the sleeve and normally tending to maintain the sleeve in its lowermost position, and means for elevating and holding the sleeve in elevated position.

3. A tank control for motor vehicles comprising a fuel feed pipe extending into the supply tank, a cap having a conical outer face enclosing the lower end of the pipe and having an opening therein adapted to permit the flow of fuel into the lower end of the pipe, a sleeve sliding upon the pipe and cooperating with the conical face of the cap to prevent the flow of fuel directly into the lower end of the pipe when the sleeve is located in its lowermost position, means for yieldingly retaining the sleeve in this position, and means for elevating and holding the sleeve in a second position permitting fuel to flow directly from the tank into the lower end of the pipe.

4. A tank control for motor vehicles comprising a fuel pipe extending into the supply tank, a sliding sleeve cooperating with the tank and adapted to control the passage of fuel thereto, a coiled spring surrounding the pipe within the sleeve and having an extension provided with a hook upon the lower end adapted to engage with the pipe and an extension upon the opposite end connected to the sleeve, an operating instrumentality upon the dashboard of the vehicle, and a mechanical connection between the operating instrumentality and the extension projecting from the upper end of the coiled spring to permit the position of the sleeve to be controlled by the operator.

ALEXANDER W. HUTCHINSON.